United States Patent
Smatloch et al.

(10) Patent No.: US 6,519,936 B2
(45) Date of Patent: Feb. 18, 2003

(54) ARRANGEMENT FOR TREATMENT OF EXHAUSTS RELEASED FROM AN OTTO ENGINE WITH DIRECT FUEL INJECTION

(75) Inventors: Christian Smatloch, Paderborn (DE); Walter Gross, Detmold (DE)

(73) Assignee: Benteler Automobiltechnik GmbH & Co. KG, Paderborn (DE)

( * ) Notice: Subject to any disclaimer, the term of this patent is extended or adjusted under 35 U.S.C. 154(b) by 0 days.

(21) Appl. No.: 09/997,211

(22) Filed: Nov. 29, 2001

(65) Prior Publication Data

US 2002/0078685 A1 Jun. 27, 2002

(30) Foreign Application Priority Data

Nov. 29, 2000 (DE) .......................... 100 59 195

(51) Int. Cl.⁷ ................................ F01N 3/00
(52) U.S. Cl. ............................ 60/297; 60/322
(58) Field of Search .................. 60/297, 322, 272

(56) References Cited

U.S. PATENT DOCUMENTS 5,390,494 A * 2/1995 Clegg .......................... 60/272
5,579,639 A * 12/1996 Shimoji et al. .......... 137/15.12
5,606,857 A * 3/1997 Harada ........................ 60/322
5,625,742 A * 4/1997 Boffito et al. .............. 392/345
6,216,447 B1 * 4/2001 Tikka .......................... 60/272

FOREIGN PATENT DOCUMENTS

DE 693 09 453 T2 7/1997
DE 196 04 367 A1 8/1997

* cited by examiner

*Primary Examiner*—Thomas Denion
*Assistant Examiner*—Diem Tran
(74) *Attorney, Agent, or Firm*—Henry M. Feiereisen

(57) ABSTRACT

An arrangement for treating exhaust emitted from an Otto engine with direct fuel injection, includes an engine-proximate catalytic converter and a $NO_x$ adsorber which is linked to the catalytic converter by an exhaust pipe. An outer tube with a flexible length portion in the form of a metallic bellows surrounds the exhaust pipe at formation of a circumferential gap therebetween. Provided in the gap is a metal powder which releases or adsorbs hydrogen gas in dependence on a temperature in the gap, wherein the gap is evacuated to provide a heat-insulating atmosphere.

10 Claims, 1 Drawing Sheet

ARRANGEMENT FOR TREATMENT OF EXHAUSTS RELEASED FROM AN OTTO ENGINE WITH DIRECT FUEL INJECTION

CROSS-REFERENCES TO RELATED APPLICATIONS

This application claims the priority of German Patent Application Serial No. 100 59 195.7, filed Nov. 29, 2000, the subject matter of which is incorporated herein by reference.

BACKGROUND OF THE INVENTION

The present invention relates to an arrangement for treatment of exhausts released from an Otto engine with direct fuel injection.

Modern Otto engines with direct fuel injection are characterized by lean-combustion operation or understoichiometric operating points in order to realize a lowest possible fuel consumption. As a consequence, current catalytic converters, in particular three-way catalytic converters, are not capable to completely convert the harmful components hydrocarbons (HC), carbon monoxide (CO) and nitrogen oxide ($NO_x$) into non-toxic compounds such as carbon dioxide ($CO_2$), nitrogen ($N_2$) or water ($H_2O$). The reason for the incomplete conversion of the harmful components is low exhaust temperatures and higher HC-emissions-during lean-combustion operation of the Otto engines, in particular the need for $NO_x$-reduction in the oxygen-rich exhaust gas.

For environmental reasons, a particular exhaust treatment is desired in order to achieve $NO_x$ efficiencies of above 90% at a temperature range between 300° C. and 500° C. Proposals have been made to integrate three-way catalytic converters in the exhaust line near the engine and $NO_x$-adsorbers underneath the bottom of the motor vehicles. Such arrangements must, however, reconcile two contradicting requirements. On the one hand, the three-way catalytic converters should be raised in shortest possible time to an operating temperature of >350° C. On the other hand, the exhaust temperature should not exceed 500° C. to prevent adverse effect on the maximum temperature resistance of the $NO_x$-adsorbers.

As far as a short heating time for the catalytic converters is concerned, this can be implemented by using so-called air-gap insulated exhaust guiding elements, such as exhaust manifolds or front pipes. These elements have a double-walled configuration and include thin-walled interior parts (exhaust pipes) with slight heat storage capacity, resulting in a low heat withdrawal from the exhaust and thus to a rapid heating of the catalytic converters, and exterior parts (outer tubes), which engender the tightness and provide also a load-carrying function.

To date however, the second requirement has been difficult to meet in a satisfactory manner because of the presence of temperatures of well above 500° C., in particular in the high-load range or high-speed range. As a consequence, it has been proposed to provide fairly long exhaust lines, thereby cooling the exhausts on their way to the $NO_x$-adsorbers. Still, the temperature stress remains very high so that the service life of currently available $NO_x$-adsorbers is insufficient.

It is also known to provide a cooling during supply of fuel. Such an engine-internal measure significantly deteriorates, however, the overall efficiency.

German Pat. No. DE 693 09 453 T2 describes a thermally insulating jacket under reversible vacuum for use, among others, with catalytic silencers of motor vehicles and trucks. A metal powder may be provided in the jacket for release of hydrogen.

German Pat. No. DE 196 04 367 A1 describes an exhaust pipe, which has an inner tube which can be moved inside an outer tube and defines with the outer tube an annular air gap. The outer tube is associated with an extension compensator which is formed by an hydraulic bellows-type deformation of the wall of the outer tube.

It would be desirable and advantageous to provide an arrangement for treatment of exhausts released from an Otto engine with direct fuel injection, which arrangement is able to reconcile contradictory requirements with respect to the use of a controlled catalytic converter with downstream $NO_x$ adsorber in an exhaust line.

SUMMARY OF THE INVENTION

According to one aspect of the present invention, an arrangement for treating exhaust emitted from an Otto engine with direct fuel injection, includes an engine-proximate catalytic converter; a $NO_x$ adsorber; an exhaust pipe connecting the $NO_x$ adsorber with the catalytic converter; an outer tube having a flexible length portion in the form of a metallic bellows and surrounding the exhaust pipe at formation of a circumferential gap therebetween; and a metal powder received in the gap and releasing or adsorbing hydrogen gas in dependence on a temperature in the gap, wherein the gap is evacuated to provide a heat-insulating atmosphere.

In accordance with the present invention, a heat-insulating environment is initially produced in the gap between the exhaust pipe and the outer tube, by evacuating the gap or drawing a vacuum. Through the provision of such a vacuum, the resultant insulating action causes a fastest possible heating of the catalytic converter as a consequence of a lack of heat transport through convection so that also only small amounts of harmful emissions are generated. This atmosphere has to be created only once and is maintained over the entire service life of the arrangement.

In concert with the creation of the heat-insulating atmosphere, the gap may also contain a particular metal powder which releases hydrogen gas at a temperature above approximately 450° C. to 500° C. As a result, the insulating effect of the atmosphere is negated so that the hydrogen gas, which is highly effective for transport of heat, can transfer heat from the exhaust pipe to the outer tube and ultimately to the ambient air. Thus, the $NO_x$ adsorber will not be exposed to temperatures of above about 500° C. and its temperature resistance remains uninhibited.

The present invention resolves prior art problems by attaining a rapid heating of the catalytic converter and a heat transport at elevated temperatures. The use of a metal powder by which hydrogen gas is released or re-adsorbed permits a control and adjustment of the atmosphere in the gap at particular temperatures. The composition of the metal powder is selected in dependence on the required temperature to be controlled. Examples of suitable metal powders include an alloy which contains, i.a., zirconium, vanadium and iron. The amount being used is dependent on the situation in the Otto engine at hand, on the size of the installation space available in the motor vehicle, and on the configuration of the exhaust line.

As the outer tube has normally a different temperature than the temperature of the inner exhaust pipe, a length portion of the outer tube is axially flexible to minimize occurring mechanical tension. Suitably this length portion is provided in proximity of the catalytic converter and configured as metallic bellows.

An arrangement according to the present invention allows production of an efficient drive system with reduced fuel consumption at lower emissions. In particular the service life of the $NO_x$ adsorber is greatly extended. The functional separation between the catalytic converter and the $NO_x$ adsorber allows the use of particular materials so that longer service life can be established for the exhaust pipe and the outer tube between catalytic converter and $NO_x$ adsorber, while still being able to reduce the weight.

BRIEF DESCRIPTION OF THE DRAWING

Other features and advantages of the present invention will be more readily apparent upon reading the following description of a preferred exemplified embodiment of the invention with reference to the accompanying drawing, in which the sole

DETAILED DESCRIPTION OF PREFERRED EMBODIMENTS

Figure 1:
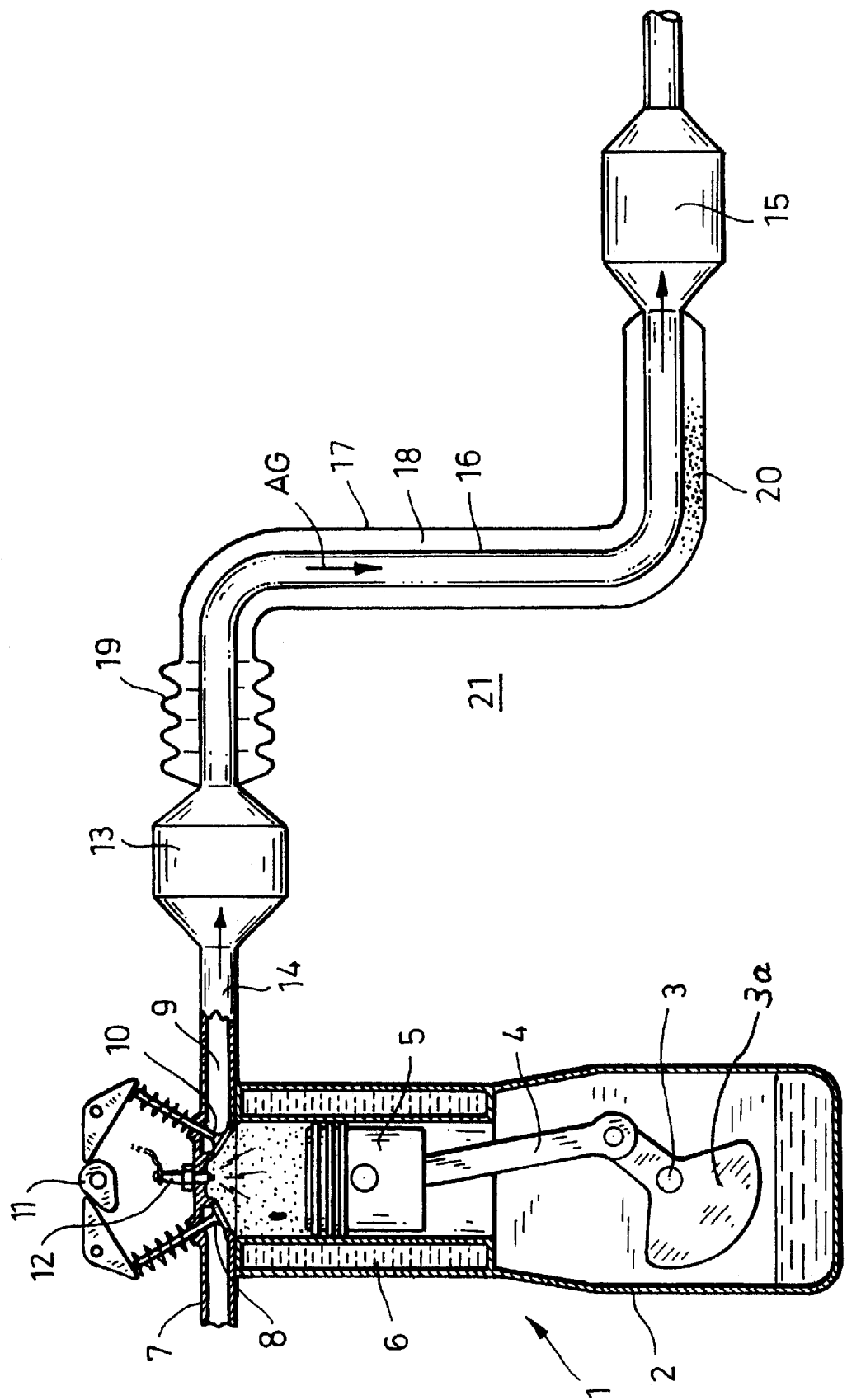
FIG. 1 shows a schematic illustration of an Otto engine with direct fuel injection, embodying an arrangement for treatment of exhausts in accordance with the present invention.

Turning now to FIG. 1, there is shown a schematic illustration of an Otto engine, generally designated by reference numeral 1 and equipped with direct fuel injection. The Otto engine includes a casing 2, a crankshaft 3 with crankshaft counterbalance 3a, a connecting rod 4 for linking the crankshaft 3 to a piston 5, a water cooling system 6, an intake port 7 with intake valve 8, and an exhaust port 9 with an exhaust valve 10. The intake and exhaust valves 8, 10 interact with a camshaft 11. Reference numeral 12 designates a spark plug. Construction and operation of the Otto engine 1 are generally known to the artisan so that a detailed description thereof is omitted for the sake of simplicity.

Connected to the exhaust port 9 by an exhaust line 14 is a controlled catalytic converter 13, e.g. three-way catalytic converter, which is disposed in proximity of the engine 1 and provided to change harmful pollutants into to harmless compounds before release into the environment. An exhaust pipe 16 extends from the catalytic converter 13 to a $NO_x$ adsorber 15 which is positioned beneath the bottom of a, not shown, motor vehicle. Construction and operation of the catalytic converter 13 and $NO_x$ adsorber 15 are also generally known to the artisan and not described in more detail for sake of simplicity.

The exhaust pipe 16 is surrounded by an outer tube 17 at a distance thereto to define an annular, peripheral gap 18. The outer tube 17 is formed adjacent the catalytic converter 13 with an axially flexible length portion in the form of a metallic bellows. The gap 18 between the exhaust pipe 16 and the outer tube 17 is evacuated. Placed in the gap 18 is a metal powder 20 which is loaded with hydrogen gas and may be made from an alloy which contains, i.a., zirconium, vanadium and iron. As a result of the vacuum in the gap 18, a heat transport through convection is prevented so that the temperature of the exhaust gas can be exploited to reduce the time required to heat up the catalytic converter 13 to an operating temperature of >350° C.

The metal powder 20 contained in the gap 18 negates the insulating effect of the vacuum, when the temperature reaches a predetermined threshold temperature of about 450° C. to 500° C., by releasing amounts of hydrogen gas which are capable to then transfer through convection heat of the exhaust gas, generated by the Otto engine 1, from the inner exhaust pipe 16 to the outer tube 17 for subsequent release to the environment 21. Consequently, the $NO_x$ adsorber 15 is exposed to a temperature of less than 500° C. and thereby has an extended service life.

When the temperature in the gap 18 falls below the predetermined threshold temperature, the metal powder adsorbs the hydrogen gas again to re-establish the vacuum in the gap 18.

While the invention has been illustrated and described as embodied in an arrangement for treatment of exhausts released from an Otto engine with direct fuel injection, it is not intended to be limited to the details shown since various modifications and structural changes may be made without departing in any way from the spirit of the present invention.

What is claimed as new and desired to be protected by Letters Patent is set forth in the appended claims.

What is claimed is:

1. An arrangement for treating exhausts emitted from an Otto engine with direct fuel injection, comprising:

an engine-proximate catalytic converter;

a $NO_x$ adsorber;

an exhaust pipe connecting the $NO_x$ adsorber with the catalytic converter;

an outer tube having a flexible length portion in the form of a metallic bellows and surrounding the exhaust pipe at formation of a circumferential gap therebetween; and a metal powder received in the gap and releasing or adsorbing hydrogen gas in dependence on a temperature in the gap, wherein the gap is evacuated to provide a heat-insulating atmosphere.

2. An Otto engine with direct fuel injection, comprising:

an exhaust line for conducting exhausts;

a catalytic converter disposed in the exhaust line; and a $NO_x$ adsorber disposed in the exhaust line downstream of the catalytic converter, wherein between the catalytic converter and the $NO_x$ adsorber the exhaust line is comprised of an inner exhaust pipe and an outer tube which surrounds the inner exhaust pipe at a distance to define an annular gap under vacuum for receiving a metal powder loaded with hydrogen gas and configured to release and re-adsorb hydrogen gas in dependence on a predetermined threshold temperature in the gap to thereby allow rapid heating up of the catalytic converter by exploiting heat of the exhausts in the exhaust line so long as the temperature in the gap is below the threshold temperature and hydrogen gas is bound by the metal powder, and prevention of the temperature in the gap to exceed the threshold temperature by releasing hydrogen gas from the metal powder.

3. The Otto engine of claim 2, wherein the metal powder is an alloy which contains zirconium, vanadium and iron.

4. The Otto engine of claim 2, wherein the threshold temperature is in a range between approximately 450° C. to 500° C.

5. The Otto engine of claim 2, wherein the outer tube has in proximity of the catalytic converter a section which is axially flexible for compensating temperature differences between the inner exhaust pipe and the outer tube.

6. The Otto engine of claim 5, wherein the axially flexible section of the outer tube is a metallic bellows.

7. An exhaust line for connecting a catalytic converter and a $NO_x$ adsorber of an Otto engine with direct fuel injection, comprising an inner exhaust pipe; an outer tube surrounding the inner exhaust pipe at a distance to define an annular gap under vacuum; and a metal powder received in the gap, wherein the metal powder is loaded with hydrogen gas and configured to release and re-adsorb hydrogen gas in dependence on a predetermined temperature in the gap.

8. The exhaust line of claim 7, wherein the metal powder is an alloy which contains zirconium, vanadium and iron.

9. The exhaust line of claim 7, wherein the outer tube has an axially flexible section for compensating temperature differences between the inner exhaust pipe and the outer tube.

10. The exhaust line of claim 9, wherein the axially flexible section of the outer tube is a metallic bellows.

* * * * *